United States Patent
Tanosaki (10) Patent No.: US 9,740,196 B2
(45) Date of Patent: Aug. 22, 2017

(54) NUMERICAL CONTROLLER FOR CONTROLLING DRILLING OPERATION

(71) Applicant: FANUC Corporation, Minamitsuru-gun, Yamanashi (JP)

(72) Inventor: Eiji Tanosaki, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 98 days.

(21) Appl. No.: 14/788,961

(22) Filed: Jul. 1, 2015

(65) Prior Publication Data

US 2016/0011581 A1 Jan. 14, 2016

(30) Foreign Application Priority Data

Jul. 8, 2014 (JP) .................................. 2014-140769

(51) Int. Cl.
*G05B 19/18* (2006.01)
*G05B 19/416* (2006.01)

(52) U.S. Cl.
CPC .. *G05B 19/416* (2013.01); *G05B 2219/43024* (2013.01)

(58) Field of Classification Search
CPC .............. G05B 19/4145; G05B 19/418; G05B 19/4166; G05B 19/4181; G05B 19/425; G05B 19/18; B26D 5/005
USPC ................................................ 318/569, 600
See application file for complete search history.

(56) References Cited

U.S. PATENT DOCUMENTS

| 6,008,609 A * | 12/1999 | Sawashima .......... G05B 19/186 318/569 |
| 7,450,127 B2 * | 11/2008 | Hong ..................... G05B 19/41 318/569 |
| 2011/0190925 A1 * | 8/2011 | Fujishima .......... G05B 19/4155 700/173 |

FOREIGN PATENT DOCUMENTS

| CN | 102799145 A | 11/2012 |
| CN | 103226344 A | 7/2013 |
| CN | 103713581 A | 4/2014 |
| JP | H06-274220 A | 9/1994 |
| JP | H09-204217 A | 8/1997 |
| JP | 2001-312309 A | 11/2001 |
| JP | 2004-202594 A | 7/2004 |
| JP | 2007-279899 A | 10/2007 |

OTHER PUBLICATIONS

Notification of Reasons for Refusal issued Nov. 10, 2015 in Japanese Patent Application No. 2014-140769 (2 pages) with an English Translation (2 pages).

(Continued)

*Primary Examiner* — Bickey Dhakal
(74) *Attorney, Agent, or Firm* — Drinker Biddle & Reath LLP (57) ABSTRACT

A numerical controller controls a drilling operation. When a feed shaft is decelerated from the constant speed state to a stop state in a drilling operation, a bell-type acceleration/deceleration mode is selected from the constant speed state to a linear deceleration mode where deceleration is carried out at a constant rate, and then a linear deceleration mode in which a deceleration is carried out at the same constant rate as in the linear part, from the linear part to the stop state. Thus, it is possible to carry out a high-speed operation in the vicinity of a portion having a speed of zero around a hole bottom while performing a smooth deceleration.

1 Claim, 4 Drawing Sheets

(56) References Cited

OTHER PUBLICATIONS

The Notification of the First Office Action issued Jan. 17, 2017 in Chinese Patent Application No. 2015103972866 (5 pages) with an English translation (7 pages).

* cited by examiner

NUMERICAL CONTROLLER FOR CONTROLLING DRILLING OPERATION

RELATED APPLICATION DATA

This application claims priority under 35 U.S.C. §119 and/or §365 to Japanese Application No. 2014-140769 filed Jul. 8, 2014, the entire contents is incorporated herein by reference.

BACKGROUND OF THE INVENTION

1. Field of the Invention

The present invention relates to a numerical, controller for a machining tool that performs a drilling operation.

2. Description of the Related Art

In order to perform a drilling operation of drilling a workpiece, there is known a drilling device that performs a drilling operation by rotating and feeding a tool with respect to the workpiece. As an acceleration/deceleration mode in the drilling operation, a linear acceleration/deceleration mode or a bell-type acceleration/deceleration mode is performed when the tool is decelerated from a constant speed, the tool is stopped from a deceleration state, the tool is accelerated from a stop state, or the tool is changed to a constant speed from an acceleration state. Here, in the linear acceleration/deceleration mode, the tool speed is abruptly changed. Then, in the bell-type acceleration/deceleration mode, the tool speed is changed in a curved state at the early or late time of the deceleration or acceleration, and is changed in a linear state therebetween so that the tool speed is smoothly changed as a whole. It is considered that an impact for a machine may be reduced in the bell-type acceleration/deceleration mode compared to the linear acceleration/deceleration mode.

JP 6-274220 A, JP 2001-312309 A, and JP 2004-202594 A disclose a technique of performing a smooth acceleration/deceleration mode such as a bell-type acceleration/deceleration mode in order to reduce an impact for any machine.

In the above-described related art, the drilling operation is performed at a constant speed. However, since the deceleration is performed in the bell-type acceleration/deceleration mode, a smooth acceleration is performed while the speed waveform in the vicinity of the bottom of a hole is changed from the linear state to the curved state. For that reason, the tool may be stopped at the bottom of a hole so that the tool speed is decreased to about zero while the impact for the machine is reduced. Here, since the next processing is performed after the tool is stopped, the tool is maintained in position at the bottom of a hole in the stop state. As a result, there is a concern that the processing time may be increased.

SUMMARY OF THE INVENTION

Therefore, an object of the invention is to provide a numerical controller that controls a drilling operation and is able to shorten a machining time while maintaining machining accuracy during a drilling operation.

A numerical controller according to the invention controls a drilling operation of drilling a workpiece by controlling a spindle rotating a rotation tool and a feed shaft moving the rotation tool. The numerical controller includes an acceleration/deceleration maintaining section that selects, when the feed shaft is decelerated from a constant speed state to a stop state during the drilling operation, a bell-type acceleration/deceleration mode from the constant speed state to a linear part in which the feed shaft is decelerated at a constant rate, and carries out a linear deceleration in an area from the linear part to a stop state in a manner such that the feed shaft is decelerated at the same constant rate as in the linear part.

According to the present invention, when the feed shaft is decelerated, a bell-type acceleration/deceleration is carried out from a constant speed state to the linear part where deceleration is carried out at a constant rate, thereby carrying out smooth deceleration, and then a linear acceleration/deceleration is carried out from the linear part to a stop state, at the same rate as in the linear part, as a result, it is possible to perform a control with the stop state removed, thereby enabling to perform a high-speed operation around a hole bottom at a speed of around zero.

The numerical controller may further include: a deficient-movement-amount calculation section that obtains, when the feed shaft is decelerated from the linear part to the stop state, a deficient movement amount which will be deficient if the linear deceleration is carried out from the linear part to the stop state, with respect to the movement amount achieved when the bell-type acceleration/deceleration mode is applied from the linear part to the stop state; and an accuracy compensation section that compensates machining accuracy by instructing the deficient movement amount obtained by the deficient-movement-amount calculation section before the deceleration is carried out from the constant speed state.

In the above-described embodiment, a deficient movement amount which will be deficient when the linear acceleration/deceleration is carried out is calculated, with respect to the movement amount achieved when the bell-type acceleration/deceleration is carried out is calculated, and then the movement amount deficient in reaching the bottom of a hole to be originally machined is instructed in advance as a compensation amount, before the deceleration is carried out from the constant speed state. Since the compensation is carried out in this way, the feed shaft can accurately reach the bottom of a hole.

Since the invention has the above-described configuration, it is possible to provide a numerical controller that controls a drilling operation and is able to shorten a machining time while maintaining machining accuracy during a drilling operation.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
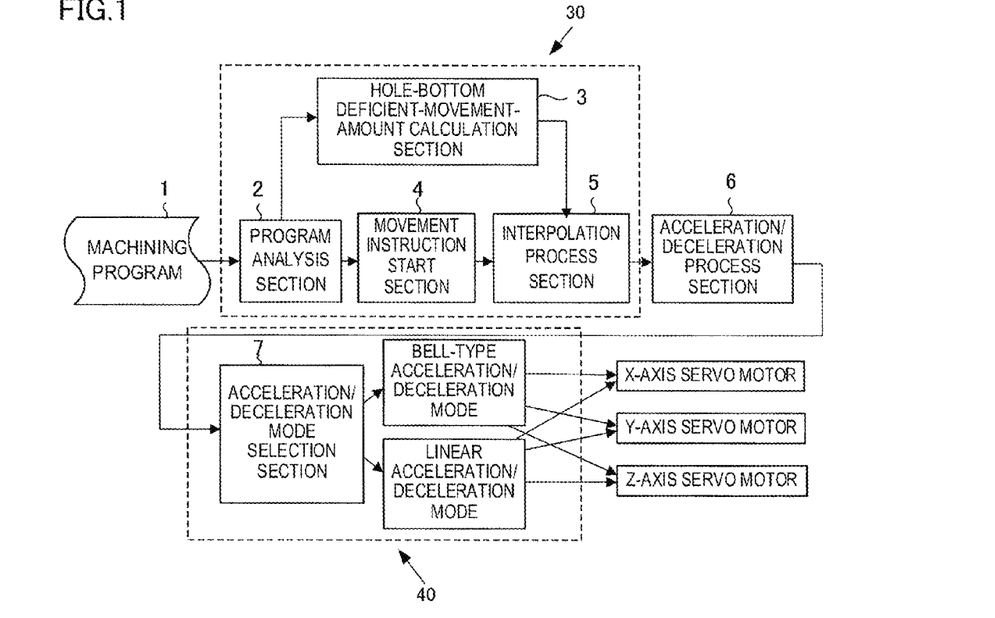
FIG. 1 is a block diagram illustrating an embodiment of a numerical controller according to the invention.

A numerical controller according to the invention will be described with reference to FIG. 1.

A program analysis section 2 reads and analyzes a machining program 1. A movement instruction start section 4 causes a feed shaft to move based on the analysis data that is analyzed by the program analysis section 2. An interpolation process section 5 creates an interpolation data by performing an interpolation using the analysis data. An acceleration/deceleration process section 6 drives a servo motor of each axis by accelerating and decelerating the feed shaft based on the created interpolation data.

A hole-bottom deficient-movement-amount calculation section 3 is provided between the program analysis section 2 and the interpolation process section 5. The hole-bottom deficient-movement-amount calculation section 3 calculates a deficient movement amount to the bottom of a hole, and the interpolation process section 5 issues an accuracy compensation instruction. A specific method of calculating a compensation amount of the accuracy compensation instruction will be described later. The program analysis section 2, the hole-bottom deficient-movement-amount calculation section 3, the movement instruction start section 4, and the interpolation process section 5 constitute an accuracy compensation section 30.

Subsequently, an acceleration/deceleration mode selection section 7 which is provided in a hole-bottom acceleration/deceleration maintaining section 40 drives the servo motor of each axis by changing and carrying out the acceleration/deceleration mode through the selection of a bell-type acceleration/deceleration mode or a linear acceleration/deceleration mode for the acceleration/deceleration of the feed shaft processed by the acceleration/deceleration process section 6.

First, a first embodiment of a numerical controller according to the invention will be described with reference to FIGS. 2 to 5.

Figure 2:
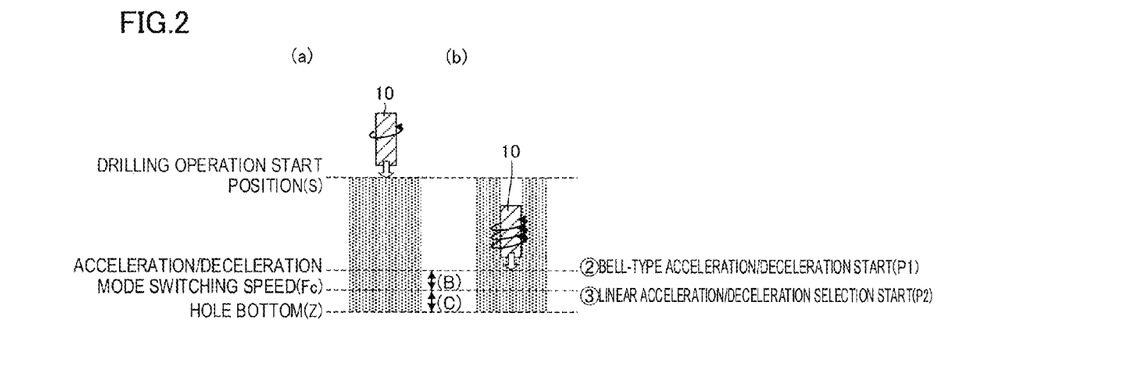
FIG. 2 is a diagram illustrating a selection of an acceleration/deceleration control method during a drilling operation using the first embodiment of the numerical controller according to the invention.

FIG. 2 is a diagram illustrating a change of an acceleration/deceleration control method during a drilling operation, where (a) illustrates a state before the drilling operation and (b) illustrates a state during the drilling operation. In FIG. 2, Reference sign S indicates a drilling operation start position, and a feed shaft 10 and a tool perform a drilling operation in a rotation state from the drilling operation start position S. From a position before the drilling operation start position S, the feed shaft 10 and the tool move at a constant speed.

Reference sign P1 indicates a point where a constant speed machining starts to be changed to a bell-type acceleration/deceleration mode. Reference sign P2 indicates a point (a linear acceleration/deceleration switching start point) where a linear-type acceleration/deceleration which has been changed from a curved-type acceleration/deceleration in the bell-type acceleration/deceleration mode is changed to a curved-type acceleration/deceleration again, in case of prior art, whereas, in case of the present invention, the linear acceleration/deceleration which has been switched from the curved-type acceleration/deceleration is maintained with the same deceleration as in the linear-type acceleration/deceleration, without being changed again to the curved-type acceleration/deceleration. In case of the present invention, the moving speed at the point P2 is Fc.

Figures 3, 4:
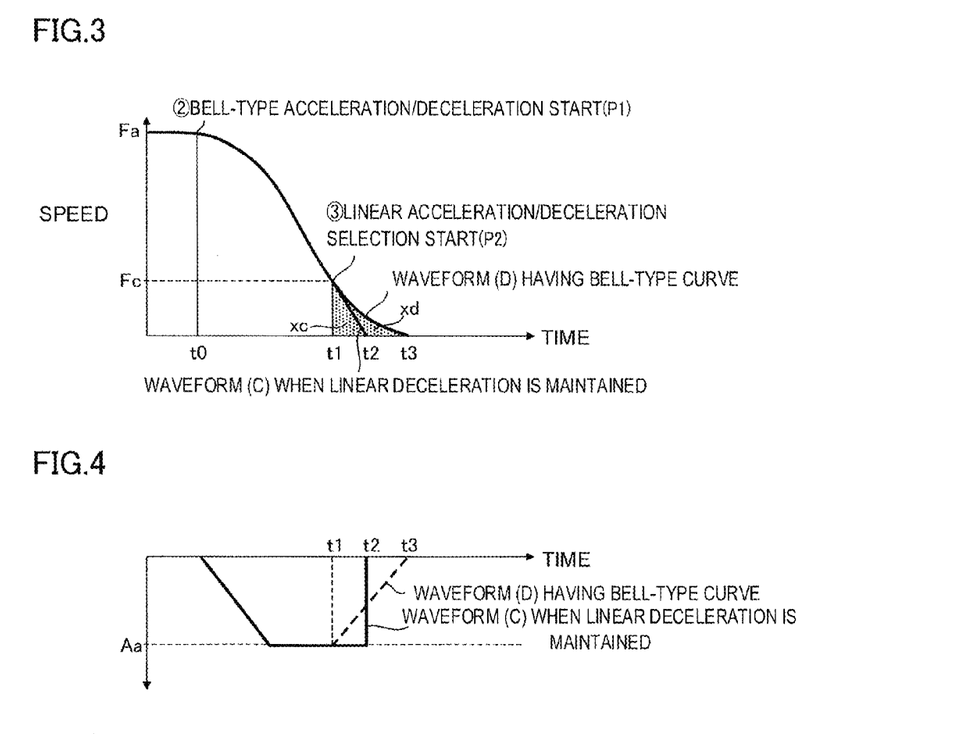
FIG. 3 is a graph illustrating a relation between a speed and a time in a feed shaft during the drilling operation illustrated in FIG. 2.
FIG. 4 is a graph illustrating a relation of acceleration in the feed shaft during the drilling operation illustrated in FIG. 2.

FIG. 3 is a graph illustrating a relation between a speed and a time in the feed shaft during the drilling operation illustrated in FIG. 2. In the case of prior art, since the linear acceleration/deceleration switching start point P2 (the time t1) is set as a start point of the curved waveform in the bell-type acceleration/deceleration mode, the time at which the speed becomes zero is t3. However, in the case of the present embodiment, since the linear acceleration/deceleration is maintained without being switched to the curved acceleration/deceleration, the time at which the speed becomes zero is t2 that is earlier than t3. As a result, the operation in the vicinity of the bottom of a hole can be performed at a high-speed as compared with prior art.

This relation is also described in FIG. 4 as a graph illustrating a relation between the time and the acceleration Aa of the feed shaft during the drilling operation illustrated in FIG. 2. In FIG. 4, a waveform in the case of the bell-type acceleration/deceleration according to prior art technique is indicated by dotted lines, whereas a waveform in the case of the linear acceleration/deceleration according to the present embodiment is indicated by solid lines.

Figure 5:
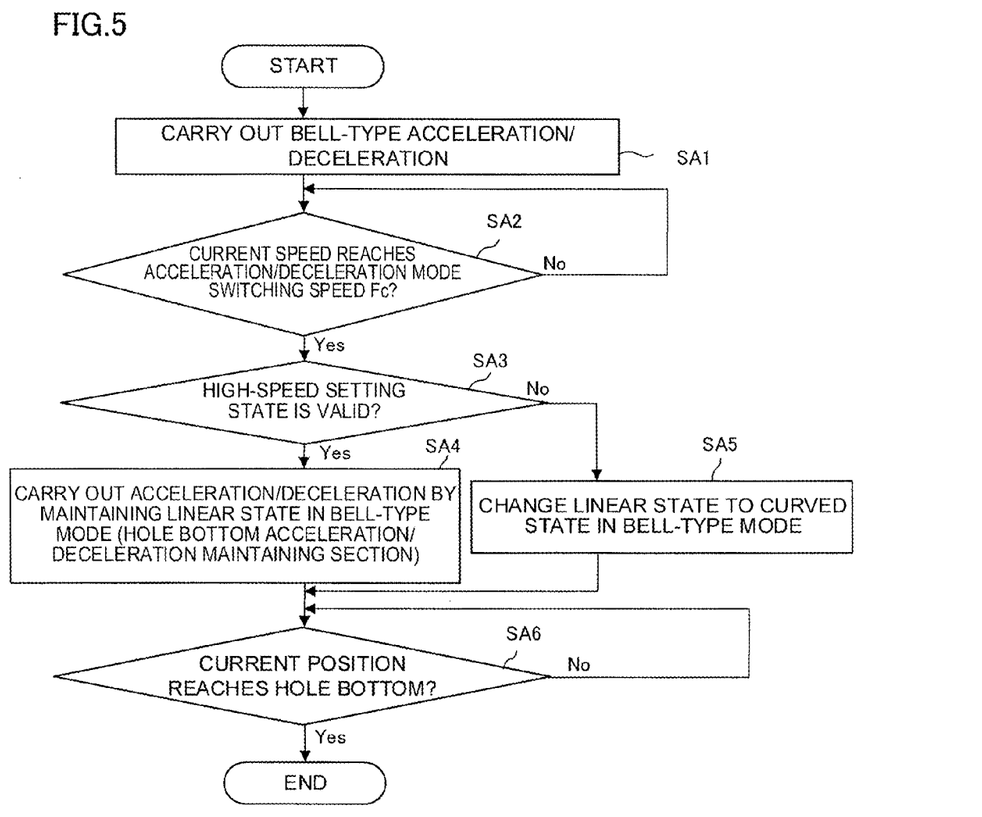
FIG. 5 is a flowchart illustrating a sequence of an operation that is performed by the first embodiment of the numerical controller according to the invention.

FIG. 5 is a flowchart illustrating a sequence of an operation that is performed by the first embodiment of the numerical controller according to the invention. Hereinafter, description is given below in line with the steps of the flowchart.

(step SA1) The constant speed machining is changed to the bell-type acceleration/deceleration.

(step SA2) It is determined whether the speed reaches the acceleration/deceleration mode switching speed Fc or not. When the speed reaches Fc (YES), the routine proceeds to step SA3. Otherwise (NO), the process in step SA2 is repeated until the speed reaches Fc.

(step SA3) It is determined whether the high-speed setting state is valid or not. When the high-speed setting is valid (YES), the routine proceeds to step SA4. Otherwise (NO), the routine proceeds to step SA5.

(step SA4) A linear acceleration/deceleration of the same deceleration as in the linear-type acceleration/deceleration in the bell-type acceleration/deceleration mode is carried out.

(step SA5) The linear-type acceleration/deceleration is switched to the curved-type acceleration/deceleration according to the original bell-type acceleration/deceleration mode.

(step SA6) It is determined whether the current position reaches the bottom of a hole position or not. When the current position reaches the bottom of a hole (YES), this operation ends. Otherwise (NO), the process in step SA6 is repeated until the current position reaches the bottom of a hole.

Next, a second embodiment of the numerical controller according to the invention will be described with reference to FIGS. 6 to 8.

In the bell-type acceleration/deceleration mode, the original waveform changes from the linear acceleration/deceleration to the curved acceleration/deceleration at the speed of about zero. However, if the deceleration is carried out while maintaining the linear acceleration/deceleration state, instead of being changed to the curved acceleration/deceleration state, as in the first embodiment, then there may be a case where the movement amount is not enough to reach the bottom of a hole. So, in the present embodiment, a movement amount deficient in reaching the bottom of a hole is calculated in advance before changing from a constant speed machining to the bell-type acceleration/deceleration mode, so that a compensation instruction is given.

Figure 6:
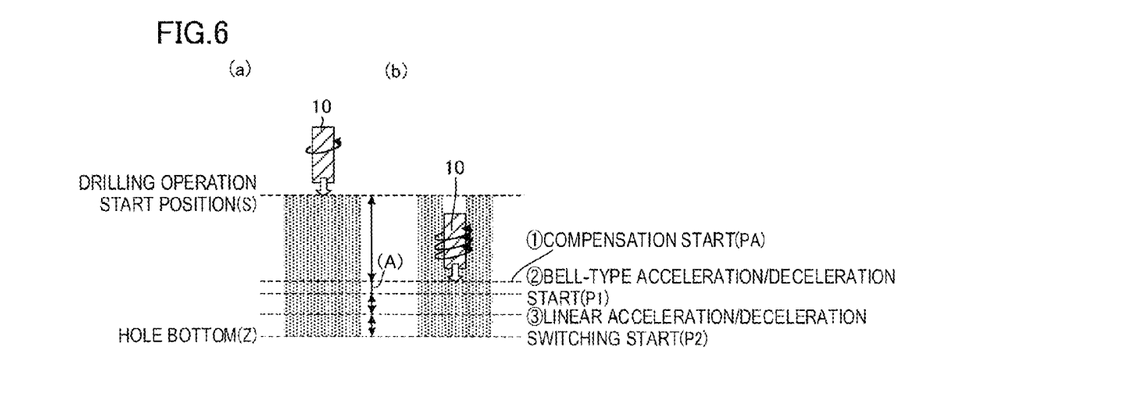
FIG. 6 is a diagram illustrating a selection of an acceleration/deceleration control method during a drilling operation using a second embodiment of the numerical controller according to the invention.

FIG. 6 is a diagram illustrating a change in an acceleration/deceleration control method during a drilling operation, where (a) illustrates a state before the drilling operation, and (b) illustrates a state during the drilling operation. In FIG. 6, reference sign S indicates a drilling operation start position, and a drilling operation starts with the feed shaft 10 and the tool rotating, from the drilling operation start position S. The feed shaft 10 and the tool move at a constant speed from a position before the drilling operation start position S.

Reference sign PA indicates a point at which compensation of the speed of the feed shaft is started, and Reference sign P1 indicates a point where a constant speed machining starts to be changed to a bell-type acceleration/deceleration mode. Reference sign P2 indicates a point (a linear acceleration/deceleration switching start point) where a linear-type acceleration/deceleration which has been changed from a curved-type acceleration/deceleration in the bell-type acceleration/deceleration mode is changed to a curved-type acceleration/deceleration again, in case of prior art, whereas, in case of the present invention, the linear acceleration/deceleration which has been switched from the curved-type acceleration/deceleration is maintained with the same deceleration as in the linear type acceleration/deceleration without being changed again to the curved-type acceleration/deceleration. In case of the present invention, the moving speed at the point P2 is Fc. Here, the process from the start of compensation at point PA until the start of the bell-type acceleration/deceleration mode after completion of the compensation is referred to as A.

Figure 7:
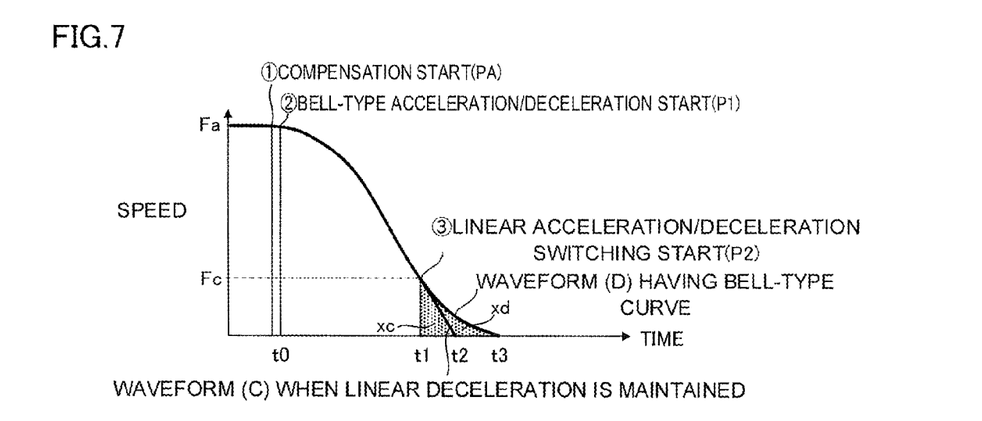
FIG. 7 is a graph illustrating a relation between a speed and a time in a feed shaft during the drilling operation illustrated in FIG. 6.

FIG. 7 is a graph illustrating a relation between a speed and a time in the feed shaft during the drilling operation illustrated in FIG. 6. In case of prior art, as the linear acceleration/deceleration switching start point P2 (the time t1) is set as the start point of the curved waveform of the bell-type acceleration/deceleration mode, the time at which the speed becomes zero is t3. However, in the case of the present embodiment, as the linear acceleration/deceleration state is maintained, instead of being changed to the curved acceleration/deceleration state, the time at which the speed becomes zero is t2 which is earlier than t3. As a result, the operation in the vicinity of the bottom of a hole can be performed at a high-speed as compared with prior art.

Here, as illustrated in FIG. 7, the waveform of the bell-type acceleration/deceleration mode (prior art) in which a linear acceleration/deceleration is changed to a curved acceleration/deceleration at the linear acceleration/deceleration switching start point P2 becomes D, and the movement distance from the linear acceleration/deceleration switching start point P2 to a point at which the speed becomes zero is Xd+Xc. On the contrary, the waveform of the present embodiment in which a linear acceleration/deceleration in the bell-type acceleration/deceleration mode is maintained in deceleration even after the linear acceleration/deceleration switching start point P2 becomes C, and the movement distance from the linear acceleration/deceleration switching start point P2 to a point at which the speed becomes zero is Xc. Therefore, the forward movement in the groove bottom is not sufficient by the amount Xd. For this reason, in the present embodiment, such a deficient movement amount Xd deficient in reaching the bottom of a hole is calculated in advance before changing from a constant speed machining to the bell-type acceleration/deceleration mode, so that compensation is carried out by delaying the timing of switching the constant speed machining to the bell-type acceleration/deceleration mode by an amount corresponding to the calculated amount Xd.

Figure 8:
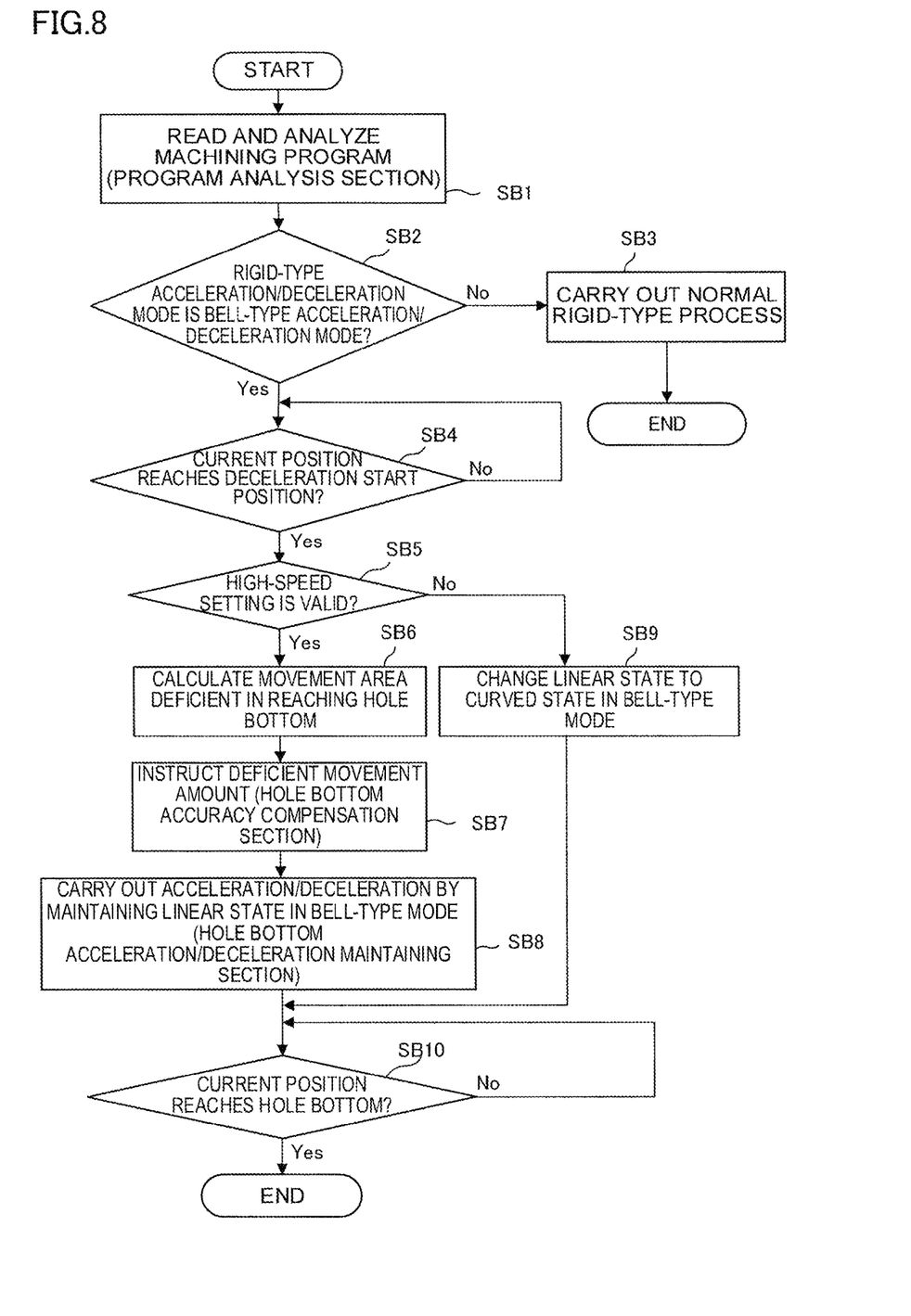
FIG. 8 is a flowchart illustrating a sequence of an operation that is performed by the second embodiment of the numerical controller according to the invention.

FIG. 8 is a flowchart illustrating a sequence of an operation that is performed by the second embodiment of the numerical controller according to the invention. Hereinafter, description is given below in line with the steps of the flowchart.

(step SB1) The machining program is read and analyzed.

(step SB2) It is determined whether or not a bell-type acceleration/deceleration mode is selected as a rigid-type acceleration/deceleration mode. When the bell-type acceleration/deceleration mode is selected (YES), the routine proceeds to step SB4. Otherwise (NO), the routine proceeds to step SB3.

(step SB3) The routine ends by performing a normal rigid-type process.

(step SB4) It is determined whether the current position reaches the deceleration start position or not. When the current position reaches the deceleration start position (YES), the routine proceeds to step SB5. Otherwise (NO), the routine in step SB4 is repeated until the current position reaches the deceleration start position.

(step SB5) It is determined whether the high-speed setting state is valid or not. When the high-speed setting is valid (YES), the routine proceeds to step SB6. Otherwise (NO), the routine proceeds to step SB9.

(step SB6) An area which will be deficient in reaching the bottom of a hole is calculated.

(step SB7) Instruction for a movement amount which will be deficient in reaching the bottom of the hole is issued. More specifically, compensation is carried out by delaying the timing in which a constant speed machining is switched to a bell-type acceleration/deceleration mode.

(step SB8) An acceleration/deceleration is carried out by maintaining the linear acceleration/deceleration state, without changing the previous linear acceleration/deceleration in a bell-type acceleration/deceleration mode.

(step SB9) The linear acceleration/deceleration in the bell-type acceleration/deceleration mode is changed to the curved acceleration/deceleration in the bell-type acceleration/deceleration mode, based on the original bell-type acceleration/deceleration.

(step SB10) It is determined whether the current position reaches the bottom of the hole or not. When the current position reaches the bottom of the hole (YES), the routine ends. Otherwise (NO), the process in step SB10 is repeated until the current position reaches the bottom of the hole.

Next, a method for calculating a deficient movement amount deficient in reaching the bottom of a hole with respect to the part D in which the speed waveform during drilling operation changes from the linear acceleration/deceleration to the curved acceleration/deceleration in the bell-type acceleration/deceleration mode and the part C in which the linear acceleration/deceleration is carried out with the same deceleration as the linear acceleration/deceleration in the bell-type acceleration/deceleration mode, for explaining the difference in the deficient movement amounts between the parts D and C.

First, the area (Xd+Xc) of the curved part of the bell-type acceleration/deceleration mode in the case (the part D) where a linear acceleration/deceleration is changed to a curved acceleration/deceleration in a bell-type acceleration/deceleration mode may be calculated as below, where:

t0 indicates a time which the bell-type acceleration/deceleration mode starts;

t1 indicates a time at which a linear acceleration/deceleration in a bell-type acceleration/deceleration mode is changed to a curved acceleration/deceleration;

t2 indicates a time at which the current position reaches the bottom of a hole in case where a linear acceleration/deceleration is carried out, without changing the previous linear acceleration/deceleration in a bell-type acceleration/deceleration mode to the curved deceleration as the linear acceleration/deceleration in the bell-type acceleration/deceleration mode;

t3 indicates a time at which the current position reaches the bottom of the hole in case where the linear acceleration/deceleration in the bell-type acceleration/deceleration mode is changed to the curved acceleration/deceleration at time t1;

Fc indicates a speed at which the current position reaches the bottom of the hole when the linear acceleration/deceleration in the bell-type acceleration/deceleration mode is changed to the curved acceleration/deceleration at time t1;

Fa indicates an instruction speed (a speed during the constant speed machining); and Aa indicates an acceleration in the bell-type acceleration/deceleration mode.

The respective values are set as below.

The time constant t3−t1 of the curved part is set by parameters.

The time constant t1−t0 of the curved part plus the linear part is set by parameters.

The instruction speed Fa is instructed by a program.

The total movement amount X is instructed by a program.

When the function of acceleration in the time range t3−t1, starting from t1 at which switching of the linear part to the curved part in the bell-type acceleration/deceleration mode is made with an acceleration zero is carried out, is denoted by A(T), A(T) is given as below.

$$A(t) = \left(\frac{t}{t3-t1} - 1\right) Aa \quad (1)$$

The speed Fc when the linear part the bell-type acceleration/deceleration mode is changed to the curved part, is given below.

$$Fc = \tfrac{1}{2} Aa \times (t3-t1) \quad (2)$$

When the function in the time range t3−t1, starting from t1 at which switching of the linear part to the curved part in the bell-type acceleration/deceleration mode is made with an acceleration zero is carried out, is denoted by F(T), F(T) is given as below.

When the function from t1 (the acceleration of zero at the changed part from the linear part to the curved part in the bell-type acceleration/deceleration mode) to t3−t1 in the bell-type acceleration/deceleration mode is denoted by F(t), F(t) is obtained as below.

$$F(t) = Fc + \int (A(t))dt = \quad (3)$$
$$Fc + \int \left(\frac{t}{t3-t1} - 1\right) Aa\, dt = \frac{1}{2} Aa \times (t3-t1) + \left(\frac{t^2}{2(t3-t1)} - t\right) Aa$$

Accordingly, the area (Xc+Xd) of the curved part in the bell-type acceleration/deceleration mode obtained when the acceleration/deceleration is changed from the linear part to the curved part is given as below.

$$(Xc + Xd) = \int_0^{t3-t1} F(t)dt \quad (4)$$
$$= \int_0^{t3-t1} \left(\frac{1}{2} Aa \times (t3-t1) + \left(\frac{t^2}{2(t3-t1)} - t\right) Aa\right) dt$$
$$= \frac{1}{2} Aa \times (t3-t1) \times (t3-t1) + \left(\frac{(t3-t1)^3}{6(t3-t1)} - \frac{(t3-t1)^2}{2}\right) Aa$$
$$= \frac{(t3-t1)^2}{6} Aa$$

Next, the area (Xc) from the linear acceleration/deceleration switching start point P2 in the case (the part C) where the linear acceleration is maintained in an acceleration control is given as below.

$$\tfrac{1}{2} \times Fc \times (t2-t1) = \tfrac{1}{4} \times Aa \times (t2-t1)(t3-t1) \quad (5)$$

Accordingly, the Xd, which is a deficient movement area shown in FIG. 3, may be calculated as below by the equations (4) and (5) above.

$$(Xc + Xd) - Xc = \frac{(t3-t1)^2}{6} \times Aa - \frac{1}{4} \times Aa \times (t2-t1)(t3-t1) \quad (6)$$

The acceleration Aa may be calculated as below by using the instruction speed Fa.

$$Fa - 2Fc = Aa \times ((t1-t0) - (t3-t1)) \quad (7)$$
$$Fa - Aa(t3-t1) = Aa \times (2t1-t0-t3)$$
$$Aa = -\frac{Fa}{t1-t0}$$

Fc may be calculated as below by using the time t2.

$$Fc = Aa \times (t2-t1) \quad (8)$$

Accordingly, t2 may be calculated as below from the equation (2) above.

$$\tfrac{1}{2} Aa(t3-t1) = Aa \times (t2-t1) \quad (9)$$
$$t2 = \frac{t3+t1}{2}$$

Next, the time which is reduced by these embodiments will be described.

As the machining program,
M29 S1000;
G84z−100. r−20. F4000.;
G80;
are instructed. Here, the time constant t1−t0 is set as 200 msec and the curved time constant t3−t1 is set as 32 msec.

From the equation (9) above, if t0=0, then t1=200, t3=232, and t2=216. Further, regarding acceleration Aa, from the equation (7) above, Aa=Fa/t1=4000/(60×1000×200)−0.000166 mm/ms².

Then, from the equation (6) above, the deficient movement area Xd is given as below.

$$Xd = \frac{0.000166 \times (232-200)^2}{6} - \quad (10)$$
$$\frac{1}{4} \times 0.000166 \times (216-200) \times (232-200) = 0.00708 \text{ (mm}^2\text{)}$$

Further, the time (td) to be added by the compensation by an accuracy compensation section is given below.

$$td = Xd/Fa = 0.0708(\text{mm}^2)/4000(\text{mm/min}) = 0.0000042 \text{ (min)} = 0.106(\text{ms}) \quad (11)$$

Further, the time (tc) which is reduced by a hole bottom acceleration/deceleration maintaining section is given below.

$$tc = t3 - t2 = 232 - 216 = 16 \text{ (ms)}$$

Accordingly, a time (ta) to be totally reduced is given below.

$$ta = tc - td = 16.0 - 0.106 = 15.9 \text{ (msec)}$$

The invention claimed is:

1. A numerical controller that controls a drilling operation of drilling a workpiece by controlling a spindle rotating a rotation tool and a feed shaft moving the rotation tool, the numerical controller comprising:

a deceleration maintaining section that selects, when the feed shaft is decelerated from a constant speed state to a stop state during the drilling operation, a bell-type deceleration mode from the constant speed state to a first linear part in which the feed shaft is decelerated at a constant rate, and maintains a linear deceleration at the constant rate in a second linear part as in the first linear part in an area from a start of the second linear part to the stop state, wherein the second linear part is started when a current speed of the spindle reaches deceleration mode switching speed;

a deficient-movement-amount calculation section that obtains, when the feed shaft is decelerated from the second linear part to the stop state, a deficient movement amount corresponding to a difference between a movement amount achieved when the linear deceleration is carried out from the start of the second linear part to the stop state and a movement amount achieved when the bell-type deceleration mode is applied from the start of the second linear part to the stop state; and an accuracy compensation section that compensates machining accuracy by instructing the deficient movement amount to be inputted into the deceleration maintaining section before the bell-type deceleration mode is carried out from the constant speed state to maintain the linear deceleration of the feed shaft at the constant rate in the second linear part to reach the stop state.

* * * * *